United States Patent [19]

Humphries et al.

[11] 4,386,048
[45] May 31, 1983

[54] VARIABLE OVERLAP CONTROL

[75] Inventors: Joseph R. Humphries, Toronto, Canada; Richard W. Knapp, West Simsbury, Conn.

[73] Assignee: Combustion Engineering, Inc., Windsor, Conn.

[21] Appl. No.: 209,572

[22] Filed: Nov. 24, 1980

[51] Int. Cl.³ .............................................. G21C 7/36
[52] U.S. Cl. .................................... 376/216; 376/219; 376/237
[58] Field of Search ............... 376/207, 216, 217, 219, 376/237, 238

[56] References Cited

U.S. PATENT DOCUMENTS

| | | | |
|---|---|---|---|
| 3,081,248 | 3/1963 | Grant | 204/193.2 |
| 3,267,002 | 8/1966 | Fromm et al. | 176/22 |
| 4,057,463 | 11/1977 | Morita | 176/22 |
| 4,075,059 | 2/1978 | Bruno | 376/216 |
| 4,169,760 | 10/1979 | Bevilacqua | 376/237 |
| 4,285,769 | 8/1981 | Specker | 376/237 |

OTHER PUBLICATIONS

Kawai, et al., "A Method for Generating a Control Rod Program for Boiling Water Reactors", Nuclear Technology, vol. 28, Jan. 1976, pp. 108-118.

Primary Examiner—Donald P. Walsh
Attorney, Agent, or Firm—L. James Ristas

[57] ABSTRACT

In a nuclear reactor having at least two control rod groups residing in the core for controlling the power level generated by the core, wherein one group is at a higher elevation in the core than the other, an improved method of controlling the core axial power distribution. The method comprises the steps of monitoring the core axial power distribution to provide a measured index, comparing the measured index with an axial power distribution target index, determining whether the measured index exceeds the target index, determining which axial portion of the core is generating an excessive proportion of the core power output, moving each group farther apart by substantially the same distance if the lower portion of the core is generating excessive power, and moving each group closer together by substantially the same distance if the upper portion of the core is generating excessive power, whereby the axial imbalance in the power distribution is reduced and the axial power distribution is brought within the target index.

1 Claim, 6 Drawing Figures

VARIABLE OVERLAP CONTROL

BACKGROUND OF THE INVENTION

This invention relates to the control of nuclear reactors and particularly to the control of the axial power distribution in pressurized water power reactors.

A variety of control rod types, each typically containing a high thermal neutron absorber such as $B_4C$, are used to provide many of the power-related control functions necessary for satisfactory reactor performance. Satisfactory performance requires the ability to quickly shut down, or "scram", the reactor at the onset of a potentially dangerous condition, so that the neutron power generated may be quickly reduced to substantially zero. A second form of control permits the power output of the reactor to be continuously varied between zero and the full power rating of the system. Finally, the power shape or distribution within the core is controlled to avoid localized hot spots which are a safety-related limitation on the permitted power output of the reactor.

Conventionally, a plurality of control rods are ganged to remain out of the core during normal operation, ready to be scrammed simultaneously in the event of a dangerous condition. These are called shutdown rods and are not used during normal operation. The power level changes during normal operation are performed by regulating rods which are typically divided into four or five groups, each sequentially inserted into or withdrawn from the reactor core as the power level is to be lowered or raised. Typically the first regulating group, which may consist of four to eight control rods symetrically disposed about the reactor core, will enter the core region from the top and continue inserting to about 60% of the full axial extent of the core at which time the second regulating group will enter the core. This staggering or overlap of the regulating rods is typically fixed between each group and does not vary over the course of the operating history of the reactor. A third set of control rods, the part length rods, contains poison material only over a part of each rod. The part length rods are inserted into the core and moved therein for the purpose of controlling the axial power shape.

Control of the axial power shape is important during both full and intermediate power operation. Accordingly, the part length rods are moved independently of the regulating groups to control the axial shape while the power level may be maintained constant or, if desired, adjusted using the regulating groups. Another known technique for adjusting the axial power shape while maintaining constant power level is to change the soluble boron concentration in the moderator in order to influence the moderator temperature coefficient of the reactor. The moderator temperature coefficient has a predictable effect on the axial power shape. This technique, however, requires significant adjustment of the regulating groups because the change in boron concentration has a significant effect on core reactivity. Furthermore, changing the boron concentration requires operation of boron injection and dilution systems which produces undesirable radioactive waste products.

SUMMARY OF THE INVENTION

According to the present invention, a method for controlling the axial power distribution is provided which greatly reduces the need for part length rods and which avoids the waste handling problems associated with power distribution control through soluble boron adjustment. The invention is particularly useful for controlling the axial power distribution at intermediate power levels when the power level is to remain at a constant value. These advantages are achieved by adjusting the overlap or spacing between the regulating control rod groups that are normally used for controlling the core power level.

The steps of the invention include monitoring the core axial power distribution to provide a measured index, and comparing the measured index with an axial power distribution target index. It is then determined whether a correction of the axial power distribution is required. A correction is usually required when the upper or lower portion of the core is generating a disproportionate or excessive amount of power. If the lower portion of the core is generating excessive power, two of the regulating groups in the reactor core are each moved farther apart by substantially the same distance whereby the group having the initially greater insertion is moved further downward into the reactor core and the other group is moved upward out of the reactor core. This step has the effect of locating more control rod poison in the lower portion of the core which is generating the excessive power, while maintaining the amount of poison in the entire active core at a substantially constant value. Thus, the power peak in the lower portion of the core is suppressed while the reactivity, and hence the power level, of the core remains substantially constant. If the power distribution is initially peaked at the upper portion of the reactor, two regulating groups are each moved closer together by substantially the same distance. This has the effect of locating more poison in the upper portion of the reactor while maintaining the total amount of poison in the core at a substantially constant value whereby the power level is not significantly affected.

DESCRIPTION OF THE PREFERRED EMBODIMENT

Figure 1:
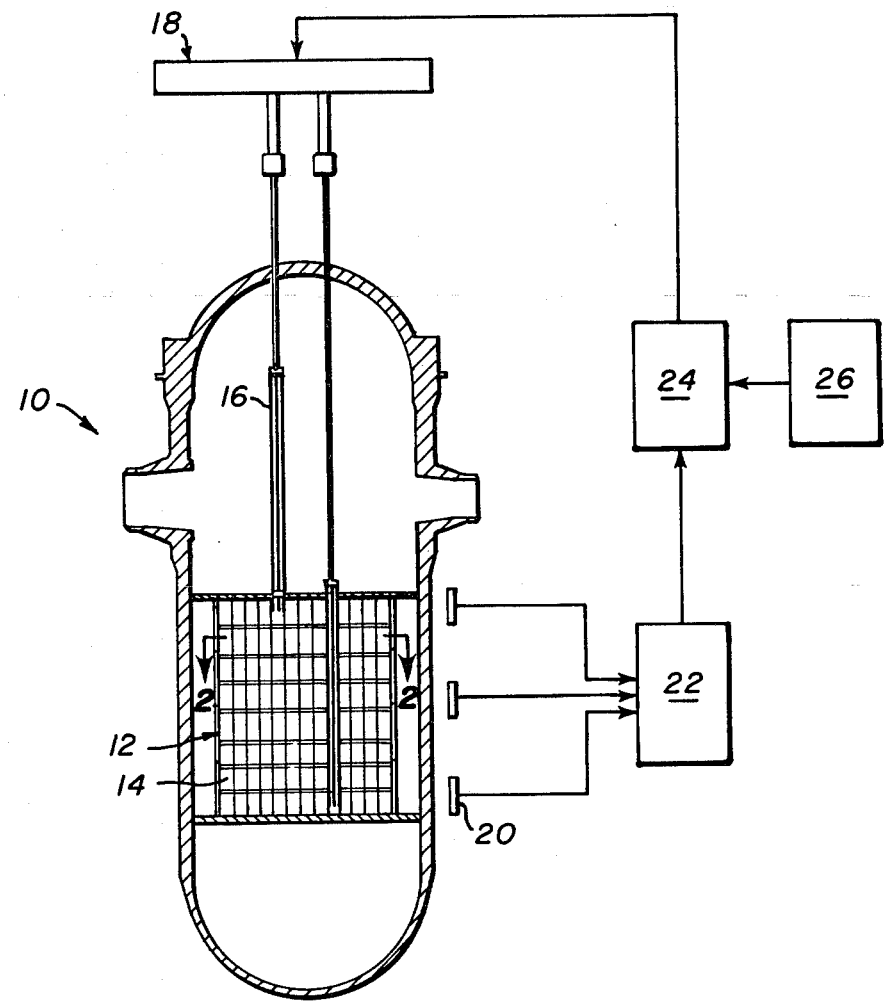
FIG. 1 is a schematic elevation view of a nuclear reactor with associated control rods and control rod logic.

FIG. 1 depicts a nuclear reactor vessel 10 including a core 12 consisting of over two hundred longitudinally disposed, adjacent square fuel assemblies 14. A plurality of control rods 16 penetrate the reactor vessel from above and are telescopingly driven into and out of the reactor core 12 by a conventional drive system 18. Only two of approximately 80–90 control rods are shown.

During reactor operation the nuclear reaction within the core 12 produces a radiation pattern outside the reactor vessel 10 which may be functionally related to the axial power distribution within the reactor core. A plurality of axially spaced ex-core detectors 20 are located outside the vessel for the purpose of monitoring the axial power distribution such that corrections in this distribution can be made. The signals from the ex-core detectors 20 are delivered to a synthesizer 22 which generates an index or other figure of merit corresponding to the measured axial power distribution. There are a variety of well-known techniques for generating such an index ranging from a simple difference between readings of designated ex-core detectors to an extremely sophisticated algorithm which includes a number of corrective factors not relevant hereto. Whether the synthesizer 22 is sophisticated or simple, a measurement index is delivered to a comparator 24 which compares the measured index with a target index generated at 26 and having a value which may or may not depend on reactor operating parameters. If the measured index exceeds the target index, a correction signal is delivered to the control rod drive system 18 whereby the axial power distribution may be adjusted by movement of the control rods 16.

In conventional axial power distribution control, the corrective signal would result in the movement of part length rods. In the present invention, however, part length rods may be eliminated and the axial power distribution control may be achieved by movement of the regulating rods, as described below.

Figure 2:
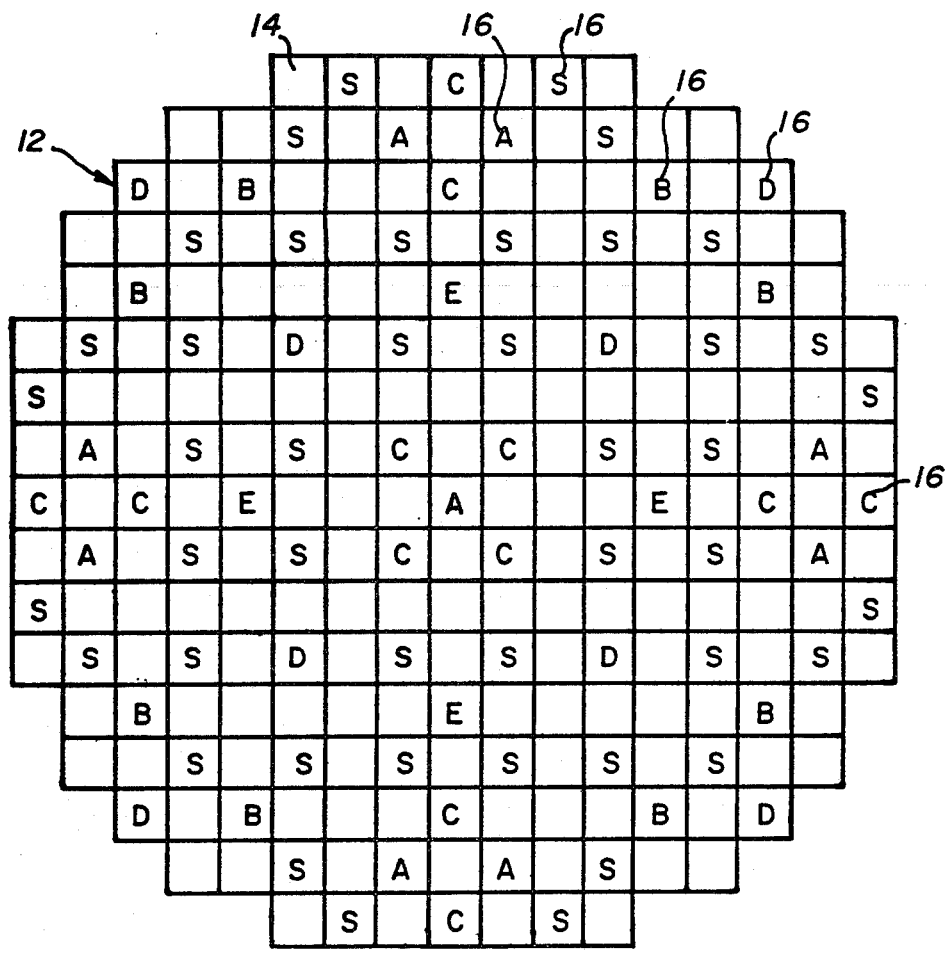
FIG. 2 is a schematic cross section of the nuclear reactor of FIG. 1, showing the control rod locations and control rod group designations.

FIG. 2 is a schematic cross section of the reactor core of FIG. 1 showing the fuel assemblies 14 and the location of each of the control rods 16 which is adapted to be inserted through the fuel assemblies. The locations designated S indicate that shutdown control rods are located over these fuel assemblies and are controlled to scram in the event of a perceived malfunction. The locations designated A, B, C, D, and E designate five regulating groups and indicate where the regulating control rods are positioned to enter the reactor core. Every control rod in a particular regulating group such as A or B is operated and moved simultaneously. Conventionally, the regulating groups are inserted or removed in sequence with a fixed overlap, or tip separation, between successive groups.

During full power operation, it is desirable that no control rods remain in the reactor core. Accordingly, the reactor is typically maintained critical at the full power rating by the adjustment of the soluble boron poison concentration in the moderator. As is well-known, the axial power distribution at full power with all rods out of the reactor varies during the burnup cycle, having somewhat of a cosine shape early in the cycle and a saddle shape with a pronounced peak in the upper portion of the core near the end of a cycle. The axial power distribution is very sensitive to changes in the axial distribution of the infinite multiplication factor, however, and accordingly a variety of axial power shapes can result from operation at part, or intermediate, power when regulating control rods are disposed in the reactor core.

Figure 3:
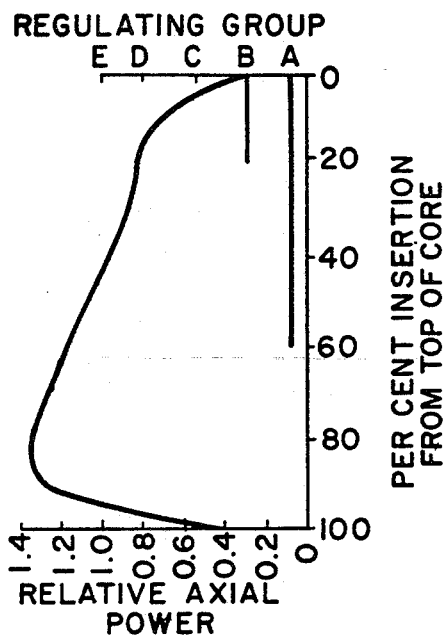
FIG. 3 is a representation of a possible bottom-peaked axial power distribution corresponding to the staggered insertion of two regulating control rod groups as depicted thereon.

FIG. 3 schematically represents the axial power distribution from the top to the bottom of the reactor core, corresponding to the part power operation resulting from the insertion of regulating groups A and B. Group A is inserted 60% and Group B is inserted 20%, a configuration which could typically occur when the core is operating at 70% of rated power.

It can be seen that most of the neutron absorbing effect of Group A and Group B occurs in the upper half of the core, which has the result of inducing a bottom peak in the axial power distribution. The peak in the relative axial power is illustrated as occurring about 85% into the core and having a value of nearly 1.4. The axial power distribution is often characterized by a figure of merit commonly known as the axial shape index (ASI) which is defined as the power generated in the lower half of the core less the power generated in the upper half, divided by the total power. Thus, an ASI equal to zero indicates that the power generated in the upper and lower halves of the core is substantially balanced or equal.

The axial power distribution illustrated in FIG. 3 has a strongly positive ASI. This would be sensed by the measurement system 20, 22 described with reference to FIG. 1 and compared with the target index 26. If the measured index exceeded the target index, the present invention would be implemented as follows.

Figure 4:
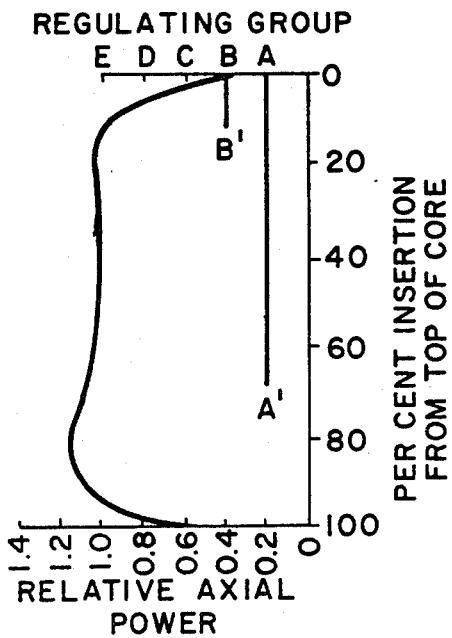
FIG. 4 is a schematic representation of an improvement in the bottom-peaked power distribution of FIG. 3, resulting from the inventive method of operating the regulating rods.

Since FIG. 3 shows excessive power is being generated in the lower portion of the core, it is desired that the power in the lower portion be suppressed, while maintaining the overall core power at the 70% level. According to the invention, regulating Groups A and B would be driven to increase the separation distance between them with the effect that a greater amount of poison would be placed in the lower portion of the core, while the total amount of poison in the core would remain substantially constant. The locations of the regulating groups after the inventive control operation are shown in FIG. 4. Group A was inserted on additional 10%, to a 70% insertion level, A', and Group B was withdrawn 10%, to a 10% insertion B'. The power distribution was thereby improved, exhibiting a lower peak to average ratio (about 1.2) and a better balance between the upper and lower portions of the reactor core.

Figure 5:
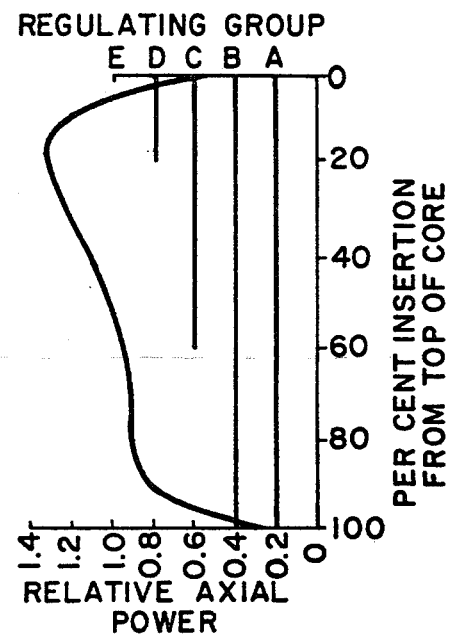
FIG. 5 is a schematic representation of a possible top-peaked axial power distribution corresponding to the regulating control rod group insertion depicted thereon.

FIG. 5 shows a schematic representation of a top-peaked axial power distribution that could typically be associated with intermediate power level near the end of a fuel cycle wherein four control rod regulating groups are in the core and the power output may be 20–30%. As described above in connection with FIG. 3, if the measured index exceeds the target index corrective action must be taken to suppress the power in the upper portion of the core. According to the present invention, the power in the upper portion of the core is suppressed by moving Groups C and D closer together by substantially the same distance.

Figure 6:
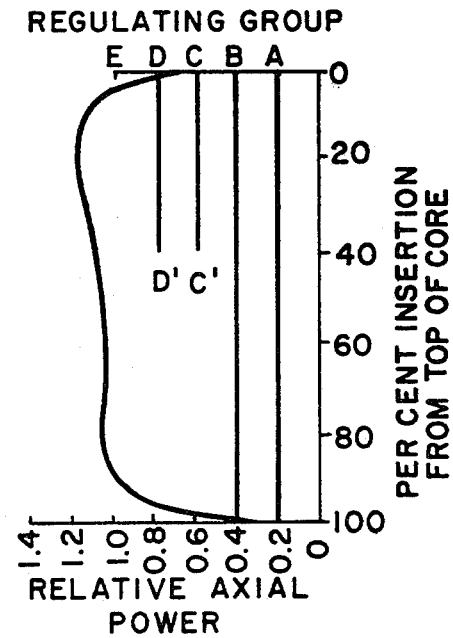
FIG. 6 is a schematic representation of the improved axial power distribution of FIG. 5 resulting from the inventive method of operating the regulating rods.

In FIGS. 5 and 6 it may be seen that Group C, which was originally 60% inserted has been moved to a position C' corresponding to 40% insertion, and Group D, which originally was inserted 20%, has been driven into the core to the 40% insertion position D'. The net effect of the adjustments is to increase the amount of control rod poison in the upper portion of the core so that the power in this upper portion is suppressed, while maintaining the total control rod poison in the core at substantially constant value whereby the core reactivity and power level remain substantially constant. As shown in FIG. 6, the adjustment according to the invention flattens the power distribution so that the measured index will be brought within the target index.

It should be appreciated that the present invention has been described in its simplest form wherein the two regulating groups used in the adjustment are in sequential relationship. For example, in FIGS. 5 and 6 the Groups C and D were adjusted to positions C' and D'. The invention also covers an adjustment whereby, for example, the top-peaked distribution of FIG. 5 may be adjusted by moving Groups B and D closer together, rather than Groups C and D. This alternative scheme might be more appropriately used when other considerations such as the radial power distribution and the differences in control rod worth of each group are taken into account.

Furthermore, the target axial power distribution index may not necessarily correspond to a flat, symmetric axial power distribution. As is well-known, the target index may preferably be burnup dependent so as to follow the axial shape corresponding to the full power, unrodded power distribution with equilibrium Xenon. The present invention may thus be used with a variety of control logic schemes so long as the corrective action required is to suppress the power in the upper or lower portion of the core.

The present invention provides axial power distribution control without the need for part length control rods and without the need for soluble boron concentration changes. The only change required of existing equipment is merely an override capability to defeat the fixed overlap between successive regulating control rod groups residing in the core. It is contemplated that the normal fixed overlap would be used during load changes in the system, but once the desired intermediate power level is reached, then the variable overlap of the present invention would be implemented to control the axial power distribution.

We claim:

1. In a nuclear reactor having at least two control rod Groups A and B residing in the core for controlling the power level generated by the core, and wherein Group A is at a higher elevation in the core than Group B, the improved method of controlling the core axial power distribution comprising the steps of:
   a. monitoring the core axial power distribution to provide a measured index;
   b. comparing the measured index with an axial power distribution target index;
   c. determining whether the measured index exceeds the target index;
   d. determining which axial portion of the core is generating an excessive proportion of the core power output;
   e. moving each Group A and B farther apart by substantially the same distance if the lower portion of the core is generating excessive power; and
   f. moving each Group A and B closer together by substantially the same distance if the upper portion of the core is generating excessive power; and
   g. whereby the axial imbalance in the power distribution is reduced and the axial power distribution is brought within the target index.

* * * * *